(No Model.)
B. T. L. THOMSON.
PROCESS OF MANUFACTURING CARBONIC ACID GAS.
No. 573,053. Patented Dec. 15, 1896.
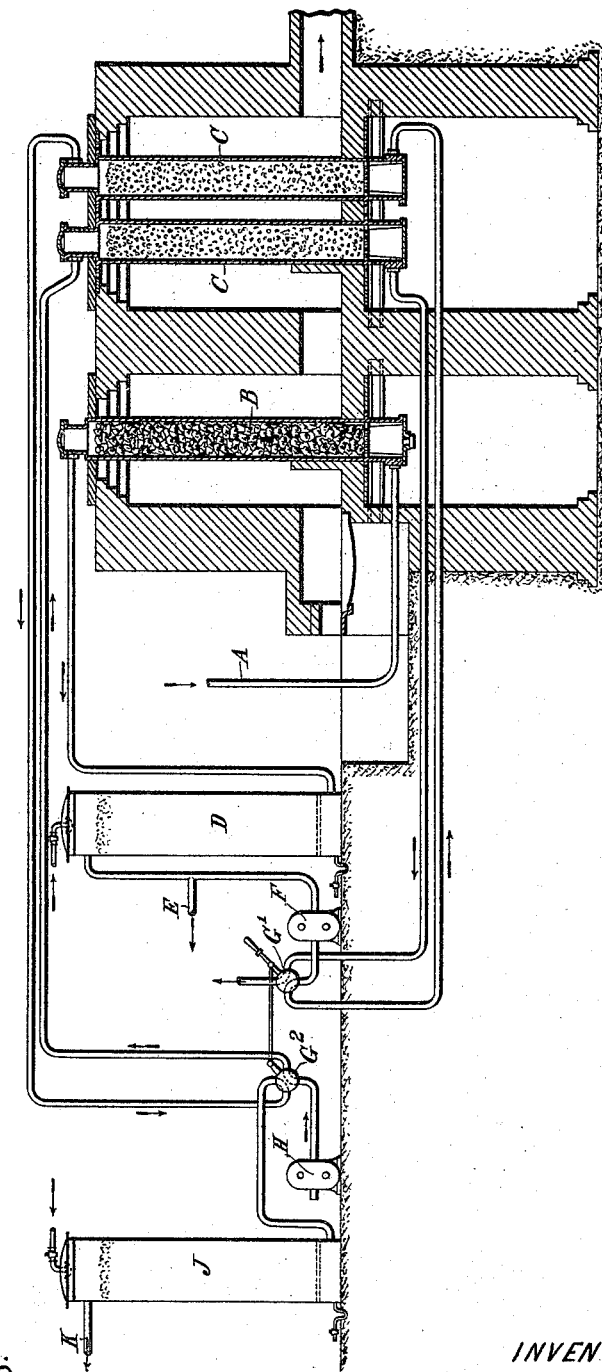
WITNESSES.
INVENTOR.

UNITED STATES PATENT OFFICE.

BENJAMIN THOMAS LINDSAY THOMSON, OF LONDON, ENGLAND.

PROCESS OF MANUFACTURING CARBONIC-ACID GAS.

SPECIFICATION forming part of Letters Patent No. 573,053, dated December 15, 1896.

Application filed May 8, 1896. Serial No. 590,766. (No specimens.)

*To all whom it may concern:*

Be it known that I, BENJAMIN THOMAS LINDSAY THOMSON, a subject of Her Majesty the Queen of Great Britain, residing at Clapham Common, London, England, have invented a certain new and useful Improved Process for the Manufacture of Carbonic-Acid Gas; and I do hereby declare that the following is a full, clear, and exact description of the invention, which will enable others skilled in the art to which it appertains to make and use the same.

According to my invention I propose to produce pure carbonic-acid gas by passing steam through heated carbon and subsequently passing the resultant gases through an oxid (such as oxid of copper) or other material capable of giving up its oxygen to hydrogen and carbon monoxid, so that the final products passing over will be carbonic acid and steam or vapor.

A convenient arrangement of apparatus for carrying out my process is illustrated in the accompanying drawing, which represents in side elevation a plant consisting of one carbon-retort, two oxidizing-retorts, two washing-retorts for the gas, one acting as a condenser for the steam, and two blowers or exhausters, together with the pipe connections and valves.

In said drawing, A is the steam-inlet pipe, the steam being supplied from any convenient source. The steam passes into vessel B, which is a metallic or other retort externally heated and filled with charcoal or other carbon or carbonaceous matter, which as consumed may be replenished through the lid. The contents of retort B being heated, the steam in passing through becomes decomposed, the oxygen combining with the carbon and the resultant gases leaving the retort consist of hydrogen, carbonic oxid, and carbonic acid. These gases, with any impurities they may contain, flow from the retort B into a washer or purifier D, from whence they are drawn by the gas-exhauster F. In order to provide for variations between the speed with which the gas is generated in retort B and drawn away by exhauster F, I prefer to place at E an intermediate reservoir or gas-holder. The exhauster F, having received the gas, drives it forward through the four-way cock $G'$ into one of the oxidizers C. These oxidizers are shown in duplicate and are charged with metallic oxid or other material which when heated in contact with atmospheric air will absorb oxygen and when so charged will give off some or all of such oxygen if hydrogen or carbonic oxid is passed over or through them and thus oxidize the gas. The oxidizers are made of metal or other suitable material and are externally heated.

By means of the two four-way cocks $G'$ $G^2$ the gases from retort B or air from the atmosphere may be passed at will alternately through one of the oxidizers C. When the valves $G'$ $G^2$ are in the position shown, the gas from $G'$ in passing through the oxidizer has its hydrogen converted into steam and its carbonic oxid converted into carbonic acid. The resulting mixture of carbonic acid and steam flows through valve $G^2$ and passes into the cooler washer or condenser J, which condenses the steam and washes the carbonic-acid gas, which passes thence to a main gas-holder or other receptacle. As soon as the contents of one of the oxidizers is exhausted of its oxygen the valves $G'$ $G^2$ are reversed, and the gas from retort B is then directed through the other oxidizing-retort C.

H is an air-blowing machine which is so connected with the valve $G^2$, the oxidizers C, and the valve $G'$ that during the period the contents of one oxidizer is being deprived of its store of oxygen the contents of the other oxidizer is taking up oxygen, owing to the passage therethrough of atmospheric air from blower H.

It is of course evident that the plant need not be confined to one or any particular number of retorts B or oxidizers C, nor to any particular method of heating the retorts or oxidizers. The number and size of retorts and oxidizers naturally depend on the output desired. In many cases it may be preferable to heat the retorts and oxidizers by gaseous fuel on the well-known regeneration system, while in some cases the necessary steam required may be generated by using the heat of the air or gases passing from the retorts and oxidizers.

What I claim is—

1. The improved process for the manufacture of carbonic-acid gas consisting in passing steam through heated carbon so as to produce carbonic oxid and hydrogen and subsequently passing these resultant gases through a heated oxid (such as oxid of copper) or other material capable of giving up its oxygen to hydrogen so as to produce steam and to carbon monoxid so as to form carbonic acid, substantially as described.

2. The improved process for the manufacture of carbonic-acid gas consisting in passing steam through heated carbon so as to produce carbonic oxid and hydrogen exhausting these resultant gases through a washer or purifier, then passing them through a heated oxid or material capable of giving up its oxygen thereto so as to produce carbonic acid and steam, then to and through a second washer for the carbonic-acid gas and a condenser for the steam, substantially as set forth.

In testimony whereof I have hereunto set my hand in the presence of two subscribing witnesses.

BENJAMIN THOMAS LINDSAY THOMSON.

Witnesses:
PHILIP M. JUSTICE,
ALLEN PARRY JONES.